No. 706,202. Patented Aug. 5, 1902.
W. E. RIVERS.
DRAFT EQUALIZER.
(Application filed Jan. 11, 1902.)
(No Model.)
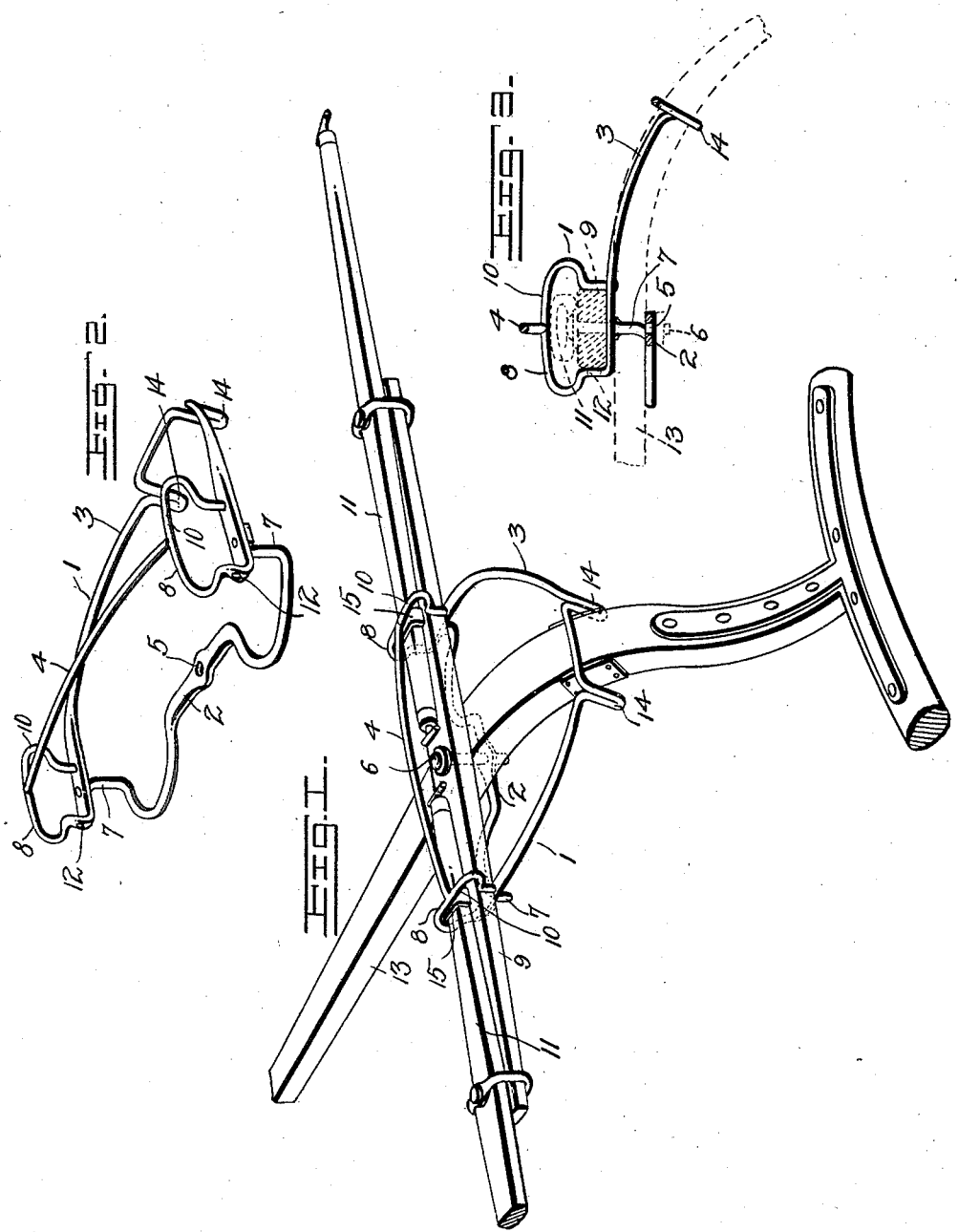
Witnesses
W. E. Rivers, Inventor.
by
Attorneys

UNITED STATES PATENT OFFICE.

WILLAM E. RIVERS, OF TRACY, IOWA.

DRAFT-EQUALIZER.

SPECIFICATION forming part of Letters Patent No. 706,202, dated August 5, 1902.

Application filed January 11, 1902. Serial No. 89,355. (No model.)

*To all whom it may concern:*

Be it known that I, WILLAM E. RIVERS, a citizen of the United States, residing at Tracy, in the county of Marion and State of Iowa, have invented a new and useful Draft-Equalizer, of which the following is a specification.

The invention relates to improvements in draft-equalizers.

The object of the present invention is to improve the construction of draft-equalizers and to provide a simple, strong, and inexpensive device adapted to be readily applied to a vehicle and capable of preventing one horse from advancing any material distance ahead of the other.

A further object of the invention is to provide a device of this character adapted to support a doubletree and singletrees and capable of holding the latter in proper position with relation to the doubletree and of preventing them from rubbing against the wheels and from getting between the spokes.

The invention consists in the construction and novel combination and arrangement of parts, hereinafter fully described, illustrated in the accompanying drawings, and pointed out in the claims hereto appended.

In the drawings, Figure 1 is a perspective view of a draft-equalizer constructed in accordance with this invention and shown applied to a pole and its whiffletrees. Fig. 2 is a perspective view of the device detached. Fig. 3 is a longitudinal sectional view of the same, the pole and the whiffletrees being shown in dotted lines.

Like numerals of reference designate corresponding parts in all the figures of the drawings.

1 designates a draft-equalizer comprising a transverse bottom bar 2, a rearwardly-extending approximately semicircular transverse bar 3, and a top connecting-bar 4, disposed transversely of the draft-equalizer and located directly above the bottom bar. The bottom bar is provided with a central perforation 5 for the reception of the pivot bolt or pin 6 of the tongue, and it has upwardly-extending arms 7, which are suitably fixed to the front portions of the rearwardly-extending approximately semicircular bar 3. The said bottom bar is provided with an approximately U-shaped central portion, and it has reversely-disposed approximately semicircular side portions, as clearly illustrated in Fig. 2 of the accompanying drawings; but any other desired configuration may be employed.

The approximately semicircular bar is provided at its ends with upwardly-extending loops 8, receiving the doubletree 9 in their lower portions and having enlarged upper portions 10, located above the doubletree and extending in advance and in rear of the same to receive and provide the necessary play for the singletrees 11. The loops are preferably formed integral with the rearwardly-extending portion 3, and the said semicircular bar or portion is preferably constructed of a single piece of metal, the end portions thereof being bent upward and rearward to form the side loops and being secured to the approximately semicircular bar or portion at the back of the loops, as clearly shown in Fig. 3. The lower reduced portions of the loops snugly receive the doubletree and are provided at the front with perforations 12 for the reception of fastening devices for securing the device to the doubletree.

The rearwardly-extending bar is provided at opposite sides of the tongue or pole 13 with depending lugs 14, adapted to limit the swing of the doubletree and capable of preventing one of the animals from advancing any material distance ahead of the other, and the tongue or pole is provided with suitable wear-plates to prevent it from being injured by the depending lugs of the curved bar 3. The lugs may be constructed in any desired manner, and the metal may be looped or bent to form the lugs, as clearly shown in Fig. 2.

The top bar 4, which connects the loops, is secured at its ends to the tops of the same near the centers thereof, and it supports and strengthens the device and at the same time extends over the inner ends of the singletrees to form a rein-guard to prevent the reins or lines from becoming caught beneath the inner ends of the singletrees.

The singletrees are provided at their inner ends with approximately U-shaped or semicircular wear-plates 15, arranged within the loops and adapted to prevent the singletrees from being injured through contact with the loops, and the latter limit the movement of the singletrees and prevent them from getting out of position with relation to the doubletree should one or more of the traces become accidentally unfastened. The loops also prevent the singletrees from rubbing against the wheels or from jumping between the spokes, and the device will prevent the doubletree from teetering on the pole.

What I claim is—

1. A combined draft-equalizer and support provided at opposite sides with loops designed to be secured to a doubletree and receiving the inner portions of the singletrees and permitting a limited movement of the same, said draft-equalizer and support being also provided with means for engaging the tongue to limit the movement of the doubletree, substantially as described.

2. A combined draft-equalizer and support comprising opposite loops designed to be secured to a doubletree and arranged to receive the inner portions of the singletrees to permit a limited movement thereof, and a rearwardly-extending bar provided at opposite sides of the tongue or pole with means for engaging the same to limit the swing of the doubletree, substantially as described.

3. A combined draft-equalizer and support comprising opposite loops designed to be secured to a doubletree and arranged to receive the inner portions of the singletrees, and the approximately U-shaped rearwardly-extending bar resting upon the pole or tongue and provided at opposite sides of the same with depending lugs, substantially as described.

4. A combined draft-equalizer and support comprising the opposite loops having reduced lower portions to receive the doubletree and provided with enlarged upper portions to permit a limited swing of the singletrees, and means for connecting the loops, substantially as described.

5. A combined draft-equalizer and support comprising the opposite loops designed to be secured to the doubletree and arranged to receive the inner portions of the singletrees to limit the swing thereof, and means for connecting the loops with each other and with the tongue or pole, substantially as described.

6. A combined draft-equalizer and support comprising the opposite loops designed to be secured to the doubletree and arranged to receive the inner portions of the singletrees, and the top bar connecting the loops and extending over the inner ends of the singletrees to form a guard, substantially as described.

7. A combined draft-equalizer and support comprising the opposite loops designed to be secured to a doubletree and arranged to receive the inner portions of the singletrees, and the bottom bar connecting the loops and pivoted to the pole and extending beneath the latter, substantially as described.

8. A combined draft-equalizer and support comprising the opposite loops designed to be secured to a doubletree and arranged to receive the inner portions of the singletrees, the bottom bar connecting the loops and extending beneath and pivotally connected to the tongue or pole, the top bar connecting the loops and extending over the inner portions of the singletrees and forming a guard, and the rearwardly-extending bar supported by the tongue or pole and provided with means for engaging the same, substantially as described.

In testimony that I claim the foregoing as my own I have hereto affixed my signature in the presence of two witnesses.

WILLAM E. RIVERS.

Witnesses:
W. C. BRADLEY,
E. A. JOHNSON.